F. Q. FREEBURGER.
AUTOMATIC POPCORN POPPING AND DISPENSING MACHINE.
APPLICATION FILED JULY 10, 1916. RENEWED JUNE 1, 1920.

1,364,430.

Patented Jan. 4, 1921.

Witnesses:

Inventor,
By
Atty.

F. Q. FREEBURGER.
AUTOMATIC POPCORN POPPING AND DISPENSING MACHINE.
APPLICATION FILED JULY 10, 1916. RENEWED JUNE 1, 1920.

1,364,430.

Patented Jan. 4, 1921.
3 SHEETS—SHEET 2.

Witnesses:

Frank Q. Freeburger
Inventor,
By
Atty.

F. Q. FREEBURGER.
AUTOMATIC POPCORN POPPING AND DISPENSING MACHINE.
APPLICATION FILED JULY 10, 1916. RENEWED JUNE 1, 1920.
1,364,430.
Patented Jan. 4, 1921.
3 SHEETS—SHEET 3.
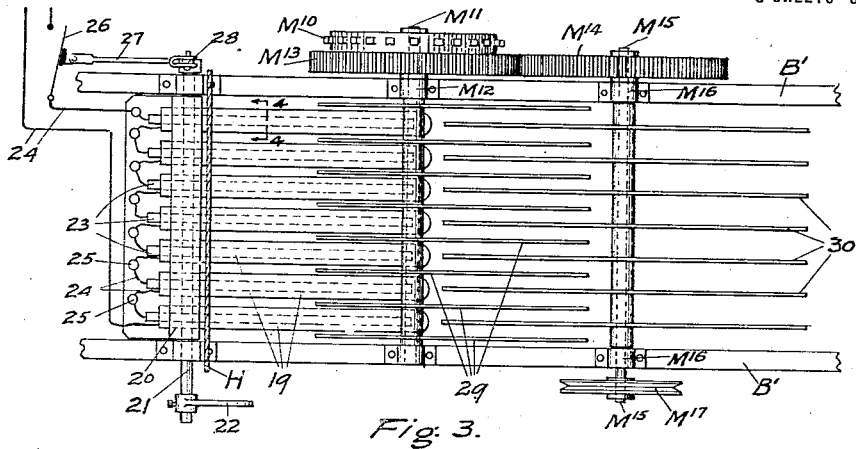
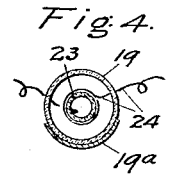
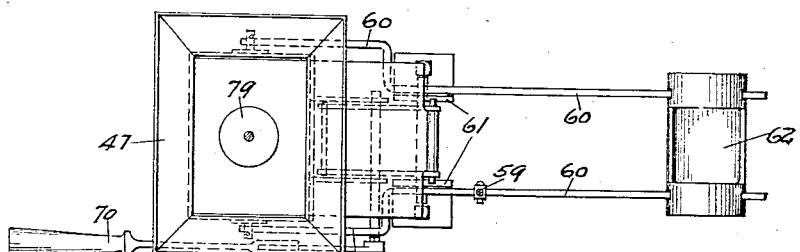

UNITED STATES PATENT OFFICE.

FRANK Q. FREEBURGER, OF PORTLAND, OREGON.

AUTOMATIC POPCORN POPPING AND DISPENSING MACHINE.

1,364,430.  Specification of Letters Patent.  Patented Jan. 4, 1921.

Application filed July 10, 1916, Serial No. 108,517. Renewed June 1, 1920. Serial No. 385,764.

*To all whom it may concern:*

Be it known that I, FRANK Q. FREEBURGER, a citizen of the United States, residing in the city of Portland, county of Multnomah, and State of Oregon, have invented certain new and useful Improvements in Automatic Popcorn Popping and Dispensing Machines, of which the following is a specification.

Among the salient objects of my invention are,—to provide in a machine of the character referred to, means for automatically measuring a definite quantity of unpopped popcorn and for discharging it on to a popping device; to provide therein an improved electric stove, or popping device, upon which said corn is discharged to be popped, with means for delivering the popped popcorn therefrom, and with means for discharging the unpopped corn therefrom; to provide therein a new and novel means for conveying the popped corn into a container therefor, said means comprising a blower, and said container preferably being made of glass, or other transparent material, whereby the discharge of the corn thereinto by means of an air blast becomes an attractive advertising feature; to provide in a machine of the character referred to, means for automatically measuring, as by weight, a definite quantity of popped corn to be dispensed from the machine; to provide means for automatically discharging a definite quantity of salt and butter, or other seasoning, into the corn so measured to be dispensed from said machine, and, in general, to provide a comparatively simple, yet an automatic machine of the character referred to which can be continuously operated without an attendant, and which will successively perform the complete function of measuring the quantity of corn to be popped, popping the same, seasoning the same and dispensing the same in measured quantities.

In order that others may understand my invention, I have illustrated one practical embodiment thereof in the accompanying sheets of drawings, which I will now describe.

Fig. 3 is a top plan view, on an enlarged scale, of the electric stove, or popping device;

Fig. 4 is a cross sectional view through one element of the electric stove, taken on line 4—4 of Fig. 3; and Fig. 5 is a top plan view of the measuring and dispensing device, taken on line 5—5 of Fig. 1.

Figure 1:
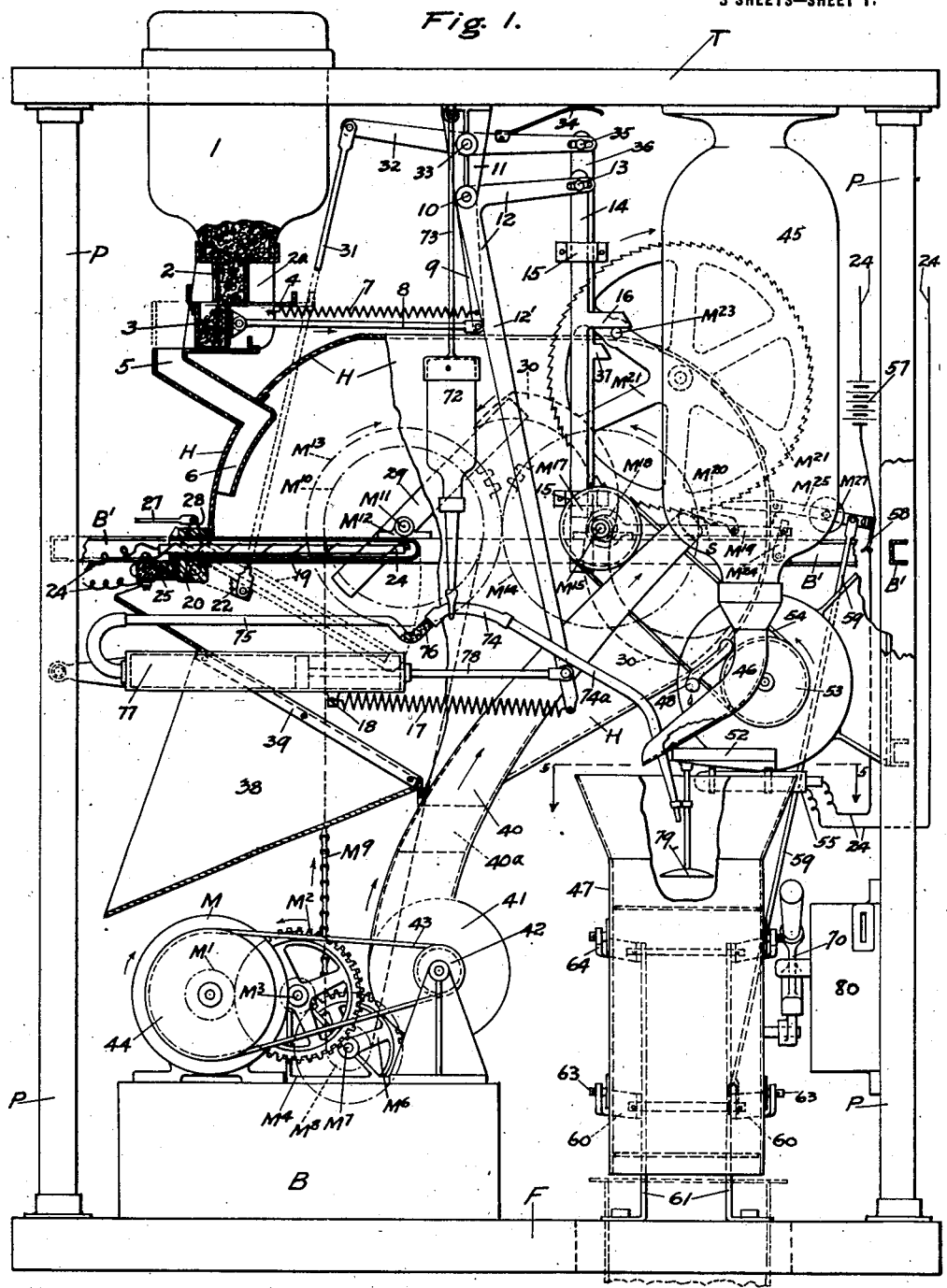
Figure 1 is a side elevation of my invention as here embodied for illustrative purposes, with certain parts broken away, and other parts shown in section.
Figure 1:

Referring more in detail to the drawings, I will now describe in detail the embodiment of my invention here illustrated. The machine is operated preferably by an electric motor designated M, mounted upon a suitable base B, in the bottom of the frame work of the machine, which comprises the floor F, the top T, and the corner posts P—P. The shaft of the motor M, is provided at one side with a small gear $M^1$, indicated in broken lines in Fig. 1, which meshes with and drives a larger gear $M^2$, upon the shaft $M^3$, supported in suitable brackets $M^4$—$M^4$, mounted upon the base B. The outer end of the shaft $M^3$, is provided with a pinion $M^5$, Fig. 2, which meshes with and drives a larger gear $M^6$, mounted upon a shaft $M^7$, also supported in the brackets $M^4$—$M^4$, as clearly illustrated in Fig. 2. Upon the outer end of the shaft $M^7$, is mounted a small sprocket wheel $M^8$, which drives a sprocket chain $M^9$, which sprocket chain runs over a large sprocket wheel $M^{10}$, mounted upon a shaft $M^{11}$, supported in suitable bearings $M^{12}$—$M^{12}$, mounted on intermediate brace members $B^1$—$B^1$, as clearly illustrated in Figs. 1, 2 and 3. Said shaft $M^{11}$, is provided adjacent the sprocket $M^{10}$, with a large gear $M^{13}$, which meshes with another large gear $M^{14}$, upon a shaft $M^{15}$, mounted in suitable brackets $M^{16}$—$M^{16}$, on the brace members $B^1$—$B^1$, said shaft $M^{15}$, being provided at its opposite end with a pulley $M^{17}$. Also mounted upon the shaft $M^{15}$, shown in dotted lines in Fig. 1, is an eccentric $M^{18}$, which reciprocates a pawl bar $M^{19}$, provided with a pawl $M^{20}$, which steps forward a large ratchet wheel $M^{21}$, mounted in a supporting bearing $M^{22}$, upon the side of the housing H, clearly shown in Fig. 2, said ratchet wheel being provided with a cam pin $M^{23}$, for a purpose hereinafter again referred to. The eccentrically operated pawl bar $M^{19}$, is pivotally supported at its opposite end by a short arm $M^{24}$, shown in dotted lines, Fig. 1. Operating upon the ratchet wheel $M^{21}$, to prevent its turning in a backward direction, is a pivoted pawl lever M²⁵, pivoted upon the edge of the housing H, in a supporting bearing, M²⁶ (Fig. 2), shown in dotted lines, Fig. 1. Said pawl lever M²⁵, is provided with a weight M²⁷.

Thus far I have described the parts which are running continuously, driven from the motor M, with some of the details directly connected with the running parts. I will now describe the remaining parts of the machine in the order of the operation of the machine.

1 designates a container for the unpopped corn, supported in the top T, of the frame of the machine, and provided at its lower end with a restricted discharge chute 2, adapted to register with a reciprocating measuring device 3, adapted to be moved into and out of register with the outlet chute 2, from said container, said measuring device having a floor-like portion 4, adapted to pass underneath the chute 2, as said measuring device 3, is moved forwardly with its load. As said container 3, is moved forwardly, it is moved into register with an open chute 5, which extends downwardly through the wall of a housing H, with a discharge portion hugging the inner side of said wall, as at 6, whereby each quantity of unpopped corn, taken from the container 1, is discharged on the inside of the housing 1, and down on to a popping device, or electric stove, shown in Fig. 3, and hereinafter described in detail.

The measuring device 3, is normally moved out of register with the outlet chute 2, from the container 1, by means of a coiled spring 7, and a rod 8. The spring 7, is attached at one end to a stationary side 2ᵃ, of the discharge chute from the container 1, and at its opposite end it is attached to an arm 9. The rod 8, is attached at one end to said measuring device 3, and at its opposite end to the lower end of said arm 9, said arm 9, being mounted upon a shaft 10, supported in suitable brackets 11—11, on the under side of the top T, of the machine.

Also mounted upon the shaft 10, near its opposite end, is a bell crank lever 12, the short arm of which is attached by means of a slot and pin connection, at 13, to a vertical reciprocating bar 14, sliding in brackets 15—15, and provided with a cam finger 16, adapted to be engaged by the cam pin M²³, on the ratchet wheel M²¹, and thereby to be intermittently raised, thus rocking the bell crank 12, the shaft 10, and the arm 9, which operates through the rod 8, to draw the measuring device into register with the outlet chute 2, of the container 1, against the tension of the spring 7. The measuring device 3, is thereupon filled with corn from the container 1, and as soon as the cam pin M²³, passes from under the cam finger 16, on the bar 14, said bar 14, drops down and the bell crank 12, is rocked under the action of the spring 7, turning shaft 10, and moving the arm 9, toward the container 1, and by means of the rod 8, also moving the measuring device 3, over into register with the chute 5, into which the contents of the measuring device 3, is discharged. The lower end of the long arm 12' of the bell crank 12, has attached to it a spring 17, one end of which is attached to a fixed part 18, as illustrated. Thus spring 17, coöperates with the spring 7, in returning the bell crank 12, the shaft 10, and the arm 9 to normal positions.

I will next describe my popping device, here shown as an electrically heated device and comprising a series of tubular glass members designated 19, closed at their forward ends, and at their rear ends inserted through a block 20, pivotally mounted upon a shaft 21, provided at its end with a rocker arm 22, whereby it can be tilted downwardly into the position shown in dotted lines in Fig. 1, for a purpose hereinafter again referred to. Mounted within each of the glass tubes 19, is another glass tube 23, through which is extended an electric resistance wire 24, said wire 24, emerging from the inner end of said inner tube, and being returned spirally around the outside of said inner tube, as clearly indicated in Fig. 1, said wires being connected, as at 25—25, while their terminal ends extend to a source of electric energy, with a switch 26, interposed, as illustrated in Fig. 3, which switch is adapted to be opened and closed by means of a rod 27, connected to the upper end of a rocker arm 28, upon the opposite end of the shaft 21, whereby as said heating device is tipped down into the position shown in dotted lines, Fig. 1, said rocker arm 28, on the shaft 21, operates through the rod 27, to open the switch 26, and open the circuit to the electric stove, or tubes, 19, during the short intervals said tubes are tilted downwardly, thus saving current for this period. It will be noticed that the glass tubes 19, constituting the electrically heated popping device, are closed enough together to support the charge of unpopped corn delivered thereupon from the inner end 6, of the chute 6, leading from the popcorn container 1.

Mounted upon the shaft M¹¹, within the housing H, and turning therewith, is a series of blades 29—29, spaced apart so as to pass between the projecting tubes 19, in a manner which will be clearly understood from Figs. 1 and 3. As these blades revolve and come up between the glass tubes 19, they not only agitate the corn upon the tubes, but pick up the corn which has been popped and carry it over and discharge it into the lower part of the housing H. Mounted upon the shaft M¹⁵, Fig. 3, is a series of combing members, or blades, 30, which revolve with said shaft M¹⁵, in the direction indicated by the arrow in Fig. 1, in which figure said combing members are shown to be of S-form, which combing members, in their revolution are timed with the revolving blades 29, on the shaft M¹¹, and operate to rake any popped corn from the blades, 29, and which might otherwise cling thereto. Thus, as each discharged quantity of corn is being popped upon the popping device 19, the revolving blades pick it off and carry it over and discharge it into the lower part of the housing H, while the combing members 30 insure the delivery of the popped corn from the blades 29. Each of the glass tube members 19, is provided on its under side with a deflector 19ª, for directing the heat rays upwardly through the corn resting upon the tops thereof, as clearly illustrated in Fig. 4.

Figure 2:
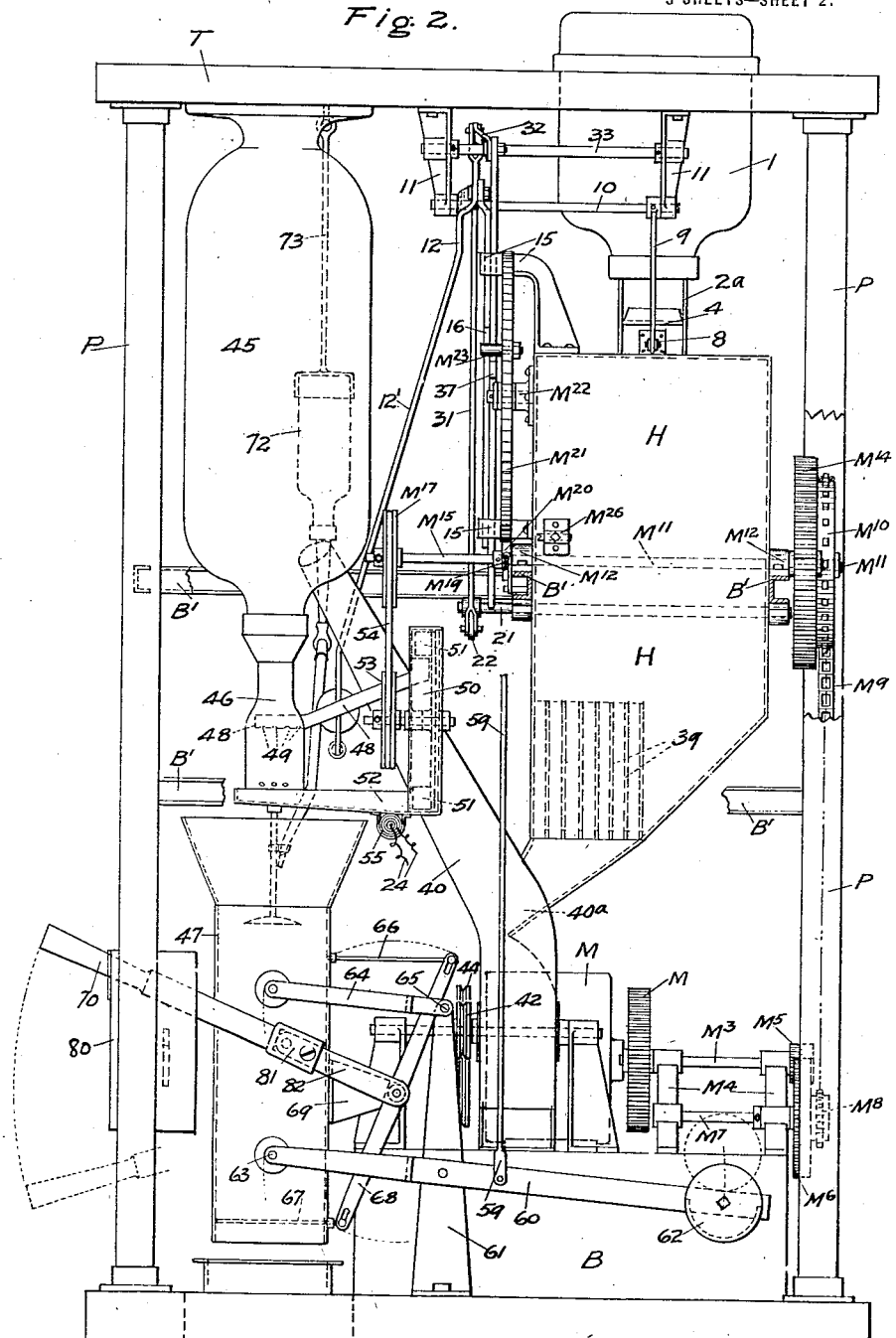
Fig. 2 is an end view thereof, looking at the machine from the right hand side from Fig. 1.

The popping devices 19, are intermittently moved downwardly into the inclined position, indicated in dotted lines, Fig. 1, for the purpose of discharging therefrom the kernels of corn which do not pop, in order to clear the device for the next charge of fresh unpopped corn. This movement of the popping device is accomplished through a rod 31, which is connected at its lower end to the arm 22, and at its upper end to a rocker arm 32, mounted upon a shaft 33, supported at its opposite ends in the brackets 11—11, as clearly illustrated in Figs. 1 and 2. The spring 34, operates upon the opposite end of said rocker arm 32, to normally hold the popping device in raised, or operating position. Connected with the outer end of the rocker arm 32, by means of a pin and slot connection at 35, is a vertical reciprocating bar 36, which extends down through the brackets 15—15, along side the bar 14, and is provided with a short cam finger 37, as clearly shown in Fig. 1, adapted to be intermittently engaged by the cam pin M²³, upon the ratchet wheel M²¹, as said ratchet wheel is revolved, whereby it raises said bar 36, and rocks said rocker lever 32, and moves the popping device downwardly into the inclined position shown in dotted lines in Fig. 1. The corn which does not pop is thus discharged from the popping device into a discharge chute 38, by means of which it is discharged out through one side of the machine, into any suitable container. An inclined grading 39, is arranged above the chute 38, through which the kernels of unpopped corn can pass, while any kernels which have popped slide down said grading 39, into the chute portion of the housing H, along with the other popped corn, which is thrown into said housing by the revolving knives 29, all of said popped corn passing from the housing into a blower tube 40, connected at its lower end with a fan chamber 41, within which is a fan operated by a pulley 42, and a belt 43, running from a pulley 44, on the motor M. By this means the corn which is discharged into the blower tube 40, is blown upwardly, as indicated by the arrows, through said blower tube 40, into a glass receptacle 45, suspended from the under side of the top T, of said machine. From said glass receptacle 45, said popped corn passes outwardly through a discharge spout 46, and drops down into a measuring and dispensing receptacle, designated as a whole 47. As said popped corn passes through the spout 46, it passes under a pipe 48, having a series of drip apertures 49, from which drips melted butter, or other fluid seasoning, as illustrated in Figs. 1 and 2. The opposite end of said pipe 48, is connected into a housing 50, within which is a series of revolving cups 51—51, which dip melted butter from the inner end of a pan 52, and discharge it into the upper end of the pipe 48, said revolving cups being operated through a pulley 53, driven by a belt 54, from the pulley M¹⁷. The dripping butter passes through the bottom of the spout 46, which is perforated, back into the butter pan 52, so that the butter is not wasted, but is kept circulating by means of the revolving cups 51, to the pipe 48, and back to the pan 52. As the kernels of corn pass through the drops of melted butter dripping from the pipe 49, they are thus seasoned.

The butter in the pan is kept melted by means of a heating device 55, which is the same as one of the heating tubes 19, and is connected into the same circuit 24—24, being shown in Fig. 1, said circuit being connected with a source of electricity, as with a battery 57, and is also provided with a second switch at 58, one part of which switch is secured to the outer end of the lever M²⁵, which lever has connected thereto an operating rod 59, which is extended downwardly and connected at its lower end with one of the rocker arms 60—60, which are pivotally mounted to the opposite sides of standards 61—61, as clearly illustrated in Figs. 2 and 5, said rocker arms 60—60, having adjustably supported thereon a cup weight 62, within which shot, or other balancing matter, can be placed, as desired.

The measuring and dispensing receptacle 47, is pivotally supported at its lower end, as at 63, between the ends of the arms 60—60, and near its upper end between the ends of the arms 64—64, which arms 64, at their opposite ends, are pivotally attached, as at 65, to the upper ends of the standards 61—61. A pair of cut-off members 66 and 67, are attached to the opposite ends of a rocker lever 68, pivoted upon a supporting bracket 69, secured to the side of the container 47, and adapted to be operated by means of an operating handle 70, whereby as said handle 70, is raised, as shown in full lines, Fig. 2, the cut-off member 67, is moved into the bottom of the container 47, while the cut-off member 66, is moved outwardly. This is the position of the parts while the measuring container 47, is being filled. In order to discharge a quantity of corn from said container, the operating handle 70, is moved downwardly by the purchaser, into the position shown in dotted lines, Fig. 2, which moves the upper cut-off 56, inwardly to catch the corn being discharged thereinto and pulls out the lower cut-off 67, to discharge the corn from the container 47, into any suitable receptacle, as 71, directly below. When the container 47, has received the predetermined quantities of popped corn, it overbalances the weight 62, raising the same, and at the same time raises the rod 59, connected with the lever $M^{25}$, and thus breaks the circuit 24, at the switch 58, and cuts off the current to the popping devices 19, and the butter heater 55. By thus moving the pawl lever $M^{25}$, its free end is disengaged from the ratchet wheel $M^{21}$, and inasmuch as the operating pawl $M^{20}$, on the pawl bar $M^{19}$, is held up firmly against the ratchet wheel $M^{21}$, by means of a spring S, said ratchet wheel $M^{21}$, simply oscillates with the pawl bar $M^{19}$, and does not perform its function, for the reason that the pawl lever $M^{25}$, is not in position to prevent said ratchet wheel moving backward with the pawl $M^{20}$. Therefore, not only the electric circuit 24, is broken, so that the popping devices 19, and the butter heating device 55, is without current, but the means which operates the feeding mechanisms for feeding unpopped corn to the popper is inactive for the reason that the ratchet wheel $M^{21}$, is not functioning.

I will now describe my means for automatically salting the popped corn in the container 47. 72 designates a container for salt, which is suspended from the top T, by means of a rod 73, said container being connected to feed salt into a flexible tubular member 74, connected at one end with a glass tube 75, having a kink 76, therein at its end connected with the flexible tube 74, into which kink a certain quantity of salt gathers. The opposite end of said glass tube is connected to the end of a cylinder 77, provided with a piston and piston rod 78, working therein, said piston being connected to the lower end of the long arm 12', of the bell crank 12, as clearly illustrated in Fig. 1, whereby as said bell crank arm 12', is moved into the position shown in full lines in Fig. 1, by means of the bar 14, and the cam finger 16, which is lifted by the cam pin $M^{23}$, on the ratchet wheel, said piston is drawn outwardly as shown, and the spring 17 is put under tension, and also the spring 7, in the manner hereinafter described. As soon as the cam pin $M^{23}$, moves from under the cam finger 16, said spring 17, operates to draw said bell crank arm 12', and to force the piston 78, into the cylinder 77. This operates to blow the charge of salt in the kink 76, in the tube 75, through the flexible tube 74, and through a feed tube $74^a$, by which it is discharged into the container 47, striking upon a deflector 79, which causes it to be scattered over the corn in the container 47. Thus as the corn is fed through the spout 46, it passes through the dripping butter and is seasoned thereby, and afterward is salted in the manner just described.

It will be understood, of course, that the several mechanisms described are all timed as to their operation, and are so connected and interdependent that they coöperate to perform the complete function for which the machine is designed. The popping devices 19, are raised from their inclined position after discharging therefrom the corn which will not pop, and just preceding the discharge of another quantity of unpopped corn thereupon. As the corn is popped it is picked up by the blades 29, carried over into the housing H, and down through said housing into an opening $40^a$, in the side of the blow pipe 40, through which it is blown up into the transparent receptacle 45. The circuit, of course, is automatically opened and closed, the switch 26, being operated when the stove, or popping device 19, is lowered and raised, as hereinafter described, while the switch 58, is opened immediately after a measure of popped corn has been put into the container 47, and is closed after the corn is removed therefrom and the levers 60, permitted to drop to their down position, shown in full lines, Fig. 2. The buttering operation, it will be understood, goes on continuously as the popped corn is passing through the chute 46, while the salting operation takes place about the time the popping device is raised from its inclined position, shown in dotted lines, Fig. 1, to receive a fresh supply of unpopped corn.

Any suitable coin-in-the-slot device, attached in any desired manner, may be used to control the discharging operation of the measuring and dispensing device 47. I have shown in a diagrammatic manner, designated 80, a coin box, with coin receiving slot, for controlling the operation of the lever 70, which is operated to discharge a quantity of popped corn from said measuring and dispensing device. As this forms no part of my invention, except as one element of the combination, and as I do not wish to be limited to any particular kind of coin-in-the-slot mechanism for controlling the trip lever 70, I have not shown the matter in detail, for the reason that mechanisms of this kind are in common use in a great many different kinds of dispensing machines. I have also shown the operating lever 70 detachable, as at 81, so as to leave the stub lever 82, adapted for attachment to any other operating mechanism than the hand lever 70, if desired. It will be understood, of course, that my entire mechanism can be inclosed in glass, with suitable openings for the operating parts, and so as to protect the mechanism.

I am aware that many changes in the general details and arrangements of my invention as here illustrated, can be made without departing from the spirit thereof, and I do not, therefore, limit the invention to the embodiment here shown, except as I may be limited by the hereto appended claims forming a part hereof.

I claim:

1. An automatic popcorn popping and dispensing machine comprising in combination a container for unpopped corn, a popping device, with means for heating the same, means for automatically and intermittently discharging a pre-determined quantity of unpopped corn from said container onto said popping device, revolving spaced members for lifting the popped corn from the unpopped corn on said popping device, means for automatically seasoning said popped corn, and a measuring and dispensing device adapted to receive said popped corn, with means for operating the same to discharge the popped corn therefrom.

2. An automatic popcorn popping and dispensing machine comprising in combination a container for unpopped corn, a popping device, with means for heating the same, means for automatically and intermittently discharging a pre-determined quantity of unpopped corn from said container on to said popping device, revolving spaced members for lifting the popped corn from the unpopped corn on said popping device, a blower mechanism for blowing said popped corn into a receptacle, a receptacle, means for automatically seasoning said popped corn, and a measuring and dispensing device adapted to receive said popped corn from said receptacle, with means for operating the same to discharge the popped corn therefrom.

3. An automatic popcorn popping and dispensing machine comprising in combination a container for unpopped corn, an electric popping device comprising a series of spaced tubular members, with means for heating the same electrically, means for automatically and intermittently discharging a pre-determined quantity of unpopped corn from said container on to said popping device, revolving means moving between said tubular members for removing the popped corn from said popping device, means for automatically seasoning said popped corn, and a measuring and dispensing device adapted to receive said popped corn, with means for operating the same to discharge the popped corn therefrom.

4. In a device of the character shown and described, in combination, a container for unpopped corn, with means for automatically and intermittently discharging a pre-determined quantity of corn therefrom, a popping device with means for heating the same, positioned to receive said unpopped corn, revolving spaced members operating through the popping device for lifting the popped corn from the unpopped corn on said popping device during the popping operation, means for conveying said popped corn into a measuring and dispensing device, and means controlled by the quantity of corn discharged thereinto for stopping the operation of said machine.

5. In a device of the character shown and described, in combination, a container for unpopped corn, with means for automatically and intermittently discharging a pre-determined quantity of corn therefrom, a popping device with means for heating the same, positioned to receive said unpopped corn, revolving spaced members operating through the popping device for lifting the popped corn from the unpopped corn on said popping device during the popping operation, means for conveying said popped corn into a measuring and dispensing device, means for automatically seasoning said popped corn, and means controlled by the quantity of corn discharged into said measuring and dispensing device for stopping the operation of said machine.

6. In a device of the character shown and described, in combination, a container for unpopped corn, a popping device with means for heating the same, means for automatically and intermittently discharging a pre-determined amount of unpopped corn from said container on to said popping device, and revolving spaced members moving upwardly through the popping device for lifting the corn as popped from said popping device.

7. In a device of the character shown and described, in combination, a container for unpopped corn, a popping device with means for heating the same, means for automatically and intermittently discharging a pre-determined amount of unpopped corn from said container on to said popping device, revolving spaced members moving upwardly through the popping device for lifting the corn as popped from said popping device, and means for automatically seasoning said popped corn.

8. In a device of the character referred to, in combination, a container for unpopped corn, a popping device comprising a series of spaced, electrically heated, members with a source of electric energy connected therewith, means for discharging pre-determined amounts of unpopped corn from said container on to said popping device, means for removing the corn therefrom as popped, comprising a series of revolving blades moving upwardly between said spaced members, and means for operating the same.

9. A popcorn popping and dispensing machine comprising in combination a container for unpopped corn, a measuring device for discharging the corn therefrom, a popping device with means for heating the same, revoluble means moving upwardly through said popping device for lifting the popped corn from said popping device as it is popped, a receptacle, a blower for blowing the popped corn thereinto, a measuring and dispensing device into which said receptacle discharges said popped corn, means for seasoning said popped corn as it passes from said receptacle into said measuring and dispensing device, and power furnishing mechanism with operating connections for operating said machine, substantially as described.

10. A popcorn popping and dispensing machine comprising in combination a container for unpopped corn, a measuring device for discharging the corn therefrom, a popping device with means for heating the same, revoluble means moving upwardly through said popping device for lifting the popped corn from said popping device as it is popped, a receptacle, means for blowing the popped corn thereinto, a measuring and dispensing device into which said receptacle discharges said popped corn, means for seasoning said popped corn as it passes from said receptacle into said measuring and dispensing device, said measuring and dispensing device being automatically operated by a pre-determined quantity of popped corn discharged thereinto for automatically stopping said machine, substantially as described.

11. A popcorn popping and dispensing machine comprising in combination a container for unpopped corn, a measuring device for discharging the corn therefrom, a popping device with means for heating the same, means for lifting the popped corn therefrom during the popping operation, a receptacle, a blower for blowing the popped corn thereinto, a measuring and dispensing device into which said receptacle discharges said popped corn, means for seasoning said popped corn as it passes from said receptacle into said measuring and dispensing device, and power furnishing mechanism with operating connections for operating said machine, substantially as described.

12. In a device of the character shown and described, in combination, a container for unpopped corn, a popping device with means for heating the same, means for automatically and intermittently discharging a pre-determined amount of unpopped corn from said container on to said popping device, means for mechanically lifting the popped corn therefrom during the popping operation, a receptacle, and a blower for blowing the popped corn into said receptacle.

13. In an automatic popcorn machine, in combination, a popping device, means for automatically and intermittently feeding a quantity of unpopped corn thereto, means for automatically and intermittently removing the popped corn from said popping device during the popping operation, a measuring and dispensing receptacle with means for directing the popped corn thereto as it is popped, a butter dripping device through which said corn passes on its way to said measuring and dispensing receptacle, a salting device adapted to automatically and intermittently discharge a quantity of salt into said popped corn in said measuring and dispensing receptacle, and power-furnishing means for operating said several mechanisms, substantially as described.

14. In an automatic popcorn machine, in combination, a popping device, means for automatically and intermittently feeding a quantity of unpopped corn thereto, means for automatically and intermittently removing the popped corn from said popping device during the popping operation, a measuring and dispensing receptacle with means for directing the popped corn thereto as it is popped, a butter dripping device through which said corn passes on its way to said measuring and dispensing receptacle, a salting device adapted to automatically and intermittently discharge a quantity of salt into said popped corn in said measuring and dispensing receptacle, and a coin-in-the-slot device for controlling the operation of said measuring and dispensing device, substantially as described.

15. In a popcorn machine, a popping device comprising a series of spaced popping members, means for heating the same, and a series of blade-like members revolubly mounted and adapted to pass upwardly between said spaced popping members, whereby to automatically pick up the popped corn without removing the unpopped corn.

Signed at Portland, Multnomah county, Oregon, this 3rd day of July, 1916.

FRANK Q. FREEBURGER.

In presence of—
  I. M. GRIFFIN,
  J. C. STRENG.